United States Patent
Jagt et al.

(10) Patent No.: US 10,009,527 B2
(45) Date of Patent: Jun. 26, 2018

(54) COMPACT LED LIGHTING UNIT FOR USE IN CAMERA OR VIDEO FLASH APPLICATIONS

(71) Applicant: PHILIPS LIGHTING HOLDING B.V., Eindhoven (NL)

(72) Inventors: Hendrik Johannes Boudewijn Jagt, Eindhoven (NL); Floris Maria Hermansz Crompvoets, Eindhoven (NL); Wouter Dekkers, Eindhoven (NL); Fritz Helmut Zahn, Eindhoven (NL); Olexandr Valentynovych Vdovin, Eindhoven (NL); Jacobus Johannes Franciscus Gerardus Heuts, Eindhoven (NL); Maria Johanna Helena Sander-Jochem, Eindhoven (NL); Christian Kleijnen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/320,348

(22) PCT Filed: May 20, 2015

(86) PCT No.: PCT/EP2015/061162
§ 371 (c)(1),
(2) Date: Dec. 20, 2016

(87) PCT Pub. No.: WO2015/197269
PCT Pub. Date: Dec. 30, 2015

(65) Prior Publication Data
US 2017/0155811 A1    Jun. 1, 2017

(30) Foreign Application Priority Data

Jun. 26, 2014  (EP) .................................... 14174046

(51) Int. Cl.
H04N 5/222 (2006.01)
H04N 5/225 (2006.01)
(Continued)

(52) U.S. Cl.
CPC ........... *H04N 5/2256* (2013.01); *F21V 5/002* (2013.01); *F21V 5/045* (2013.01); *F21V 7/00* (2013.01);
(Continued)

(58) Field of Classification Search
CPC ..................................................... H04N 5/2256
(Continued)

(56) References Cited

U.S. PATENT DOCUMENTS

| 5,485,308 A | 1/1996 | Hirata et al. |
| 2007/0139776 A1 | 6/2007 | Meng et al. |

(Continued)

FOREIGN PATENT DOCUMENTS

| WO | 2009124107 A1 | 10/2009 |
| WO | 2012060777 A2 | 5/2012 |
| WO | 2012114267 A1 | 8/2012 |

*Primary Examiner* — Usman Khan

(57) ABSTRACT

A compact LED lighting unit, (1) for camera flash applications, comprising a reflective housing having (14) having a reflective base (15) and an open top (51); an LED (10) mounted within the reflective housing (14) and a beam shaping foil stack (12) provided over the open top of the housing (14); wherein, the foil stack (12) comprises first and second microstructured sheets (50, 52), each having an array of elongate locally parallel ridges (41) facing away from the LED, wherein the ridges of one sheet locally cross the ridges of the other sheet by an angle in the range 30 to 150 degrees.

15 Claims, 12 Drawing Sheets

(51) Int. Cl.
*F21V 9/16* (2006.01)
*F21V 33/00* (2006.01)
*F21V 5/04* (2006.01)
*F21V 5/00* (2018.01)
*F21V 7/00* (2006.01)
*F21V 9/30* (2018.01)
*F21Y 115/10* (2016.01)

(52) U.S. Cl.
CPC ............... *F21V 9/16* (2013.01); *F21V 9/30* (2018.02); *F21V 33/0052* (2013.01); *F21Y 2115/10* (2016.08)

(58) Field of Classification Search
USPC ........................................... 348/371
See application file for complete search history.

(56) References Cited

U.S. PATENT DOCUMENTS

| | | | |
|---|---|---|---|
| 2008/0043326 A1* | 2/2008 | Poulsen | G03B 21/60 |
| | | | 359/455 |
| 2009/0067179 A1 | 3/2009 | Chaves et al. | |
| 2010/0165472 A1* | 7/2010 | Hamasaki | B32B 27/32 |
| | | | 359/627 |
| 2010/0178046 A1* | 7/2010 | Moon | F21L 4/02 |
| | | | 396/155 |
| 2011/0025190 A1 | 2/2011 | Jagt | |
| 2011/0222295 A1 | 9/2011 | Weber et al. | |
| 2013/0235287 A1* | 9/2013 | Im | G02B 27/2214 |
| | | | 349/15 |
| 2013/0258634 A1 | 10/2013 | Xu et al. | |

* cited by examiner (a)

(b)

(c)

(d)

(e)

(f)

(a)

(b)

(a)        (b)        (c)

COMPACT LED LIGHTING UNIT FOR USE IN CAMERA OR VIDEO FLASH APPLICATIONS

CROSS-REFERENCE TO PRIOR APPLICATIONS

This application is the U.S. National Phase application under 35 U.S.C. § 371 of International Application No. PCT/EP2015/061162, filed on May 20, 2015, which claims the benefit of European Patent Application No. 14174046.4, filed on Jun. 26, 2014. These applications are hereby incorporated by reference herein.

FIELD OF THE INVENTION

This invention relates to compact LED lighting units, for example for use in camera or video flash applications, such as flash units for mobile phones or other portable mobile device such as tablets and laptop computers.

BACKGROUND OF THE INVENTION

A compact LED lighting unit can for example be considered to be a lighting unit with a package height less than 3 mm, and an output aperture with an area of less than 100 mm$^2$. A compact lighting unit of this type can be integrated into a portable device such as a mobile phone.

Compact LED lighting units such as flash LED packages typically consist of high power LEDs to generate white light, usually at a colour temperature of about 5500-6500 K, combined with Fresnel optical lenses either through integration with the LED package directly or with a separate housing for the lens and the LED package.

These packages typically use a high power blue LED covered with a phosphor layer which converts a part of the radiation into the green-red spectral range to result in a white color point. The blue LED has typically a 1 mm$^2$ size and is mounted on a ceramic support substrate. The total outer dimensions of the LED substrate are for example typically 1.6×2.0 mm. Some packages appear very yellow due to the phosphor layer; other packages are made to appear much whiter by molding white scattering material on top and around the LED phosphor. Customers tend to dislike the yellow appearance when magnified by a Fresnel lens and hence an off-state-white (OSW) appearing package is sometimes preferred even though the efficacy is reduced by the extra white scattering layers.

Flash LEDs of this type are for example applied as flash units in mobile phone applications, such as disclosed in US20100178046. To concentrate the light on a 4:3 or 16:9 scene that is captured by the camera, the light of the flash LED, which initially has Lambertian angular distribution of intensity, is collimated by the Fresnel lens. This can be achieved by clamping the LED package and a separate Fresnel lens into a package assembly, for example with a typical height of about 3 mm. As mentioned above, the Fresnel lens can instead be combined with the LED package onto a thin PCB as one integrated, more compact unit.

FIG. 1 shows a compact LED lighting unit 1 with a Fresnel lens optical structure on the top surface. The lens is molded around the LED package on a thin PCB and this can for example achieve a reduced build height of 2.2 mm.

One example of Fresnel lens comprises optical elements in the form of facets that refract light in the center of the lens, and reflect light upwards at the periphery of the lens in order to collimate the light emitted by the LED. All-refracting lenses are also possible.

The Fresnel lens needs to be located at a certain minimum distance from the LED in order to operate properly as a lens and a careful alignment of the position of the LED to the optical center of the Fresnel lens is needed.

The build height of the flash LED with Fresnel lens is very important to mobile phone makers because it is a discriminating trend to make mobile phones thinner and thinner and use less and less space for the components inside the phone, especially in the depth direction. Breakthroughs in build height of the components in the phone are therefore very important.

In addition to physical dimension limitations, there are specific requirements to the beam profile that is emitted by a flash LED package. These requirements relate to the illumination of a scene captured by the camera and can for example be measured by projecting the light on a screen. For example, the light can be captured on a screen with the desired aspect ratio (e.g. 4:3) at 1 m from the flash unit, and regions of the screen can be analysed, for example dividing the screen into 21×31 analysis regions.

The main requirements for a Field of View (FOV) in the range 70-75 degrees are:

Light uniformity on the screen of more than 10%, preferably more than 15%, more preferably more than 20%, and even more preferably 30% or more (i.e. the minimum illuminance in the screen corners is at least the specified percentage of the maximum illuminance in the screen center;

Illuminance at screen center divided by total luminous flux >0.6, more preferably >0.7. Typical lumen output levels are 260 lm or more at 1 A pulse operation; resulting in typically more than 170 lux in the center of the screen;

Full Width Half Maximum (FWHM) of the beam profile about 65-75 degrees;

Correlated colour temperature (CCT) typically 5500-6500 K.

The light uniformity for a flash mentioned above is defined in general as the average luminous flux ("lux") at the corners of the screen divided by the lux in the center of the screen. FIG. 2 shows how the flash specifications are defined, and shows the flash unit 1 projecting onto a screen 2.

The uniformity is defined as the central lux of the screen (central bin: bC) divided by the average corner lux (corner bins: b1, b2, b3, b4).

Uniformity=$bC/(0.25*(b1+b2+b3+b4))$

The central lux (central bin, bC) divided by total emitted flux of the flash module (including the part that is not incident on the screen) is typically 0.6-0.7 lux/lm. A typical setup is a field of view of 73 degrees along the diagonal, with the screen 1 m from the flash module and a screen ratio of 4:3.

The flash unit using a known Fresnel lens design has several limitations. There is a fundamental distance required between the Fresnel lens and the LED source as indicated above. To make the package thinner, the lateral dimensions of the lens and LED package need to be scaled down. This means a smaller LED, which gives limitations to the amount of light that can be generated. For instance, for a typical LED die of 1×1 mm$^2$ the build height with a Fresnel lens is limited to about 2 mm.

LEDs emit in general with a Lambertian angular intensity distribution. Without any additional optics between the LED and the Fresnel lens, which would make the flash module bigger, the acceptance angle of the Fresnel lens is dictated by the distance from the lens to the light emitting surface and the diameter or lateral size of the lens. This is basically the numerical aperture of the Fresnel lens. Light that is emitted outside of this acceptance angle (aperture) is not useful and is in general lost. Placing a Fresnel lens closer and closer to the LED to capture more and more light is fundamentally not possible as this requires materials with higher and higher refractive indices which are not economically viable or not available.

Because of the small package size that is required there is very little possibility to extract the light from the LED efficiently. Therefore the package usually consists only of a phosphor layer that directly covers a blue LED, limiting efficiency. The Fresnel lens also enlarges the yellowish appearance from the phosphor on the LED, which is disliked by customers. To partly compensate this yellowish appearance, a white scattering layer can be employed on the LED emitter, with the drawback of reduced efficiency.

SUMMARY OF THE INVENTION

The invention is defined by the claims.

According to the invention, there is provided a compact LED lighting unit comprising:

a reflective housing having a reflective base and an open top;

an LED mounted within the reflective housing;

a phosphor associated with the LED; and an optical beam shaping arrangement over the open top of the housing, wherein the optical beam shaping arrangement comprises first and second microstructured sheets, with the second sheet over the first with respect to the reflective base, the first sheet comprising a first structured layer and the second sheet comprising a second structured layer, the structured layers having an array of elongate locally parallel ridges facing away from the LED, and having an apex angle at the peak of each ridge, wherein the ridges of one sheet are crossed with the ridges of the other sheet such that the local crossing angle is between 30 and 150 degrees.

This unit uses crossed ridge arrays to provide light collimation. These reflect light incident at certain angles and refract light incident at other angles into directions within the specified field of view. The reflected light is reflected by the housing, which functions as a light-recycling or mixing box.

In conventional compact LED packages such as for flash applications, such as dominantly used in mobile phones, a Fresnel lens optic is combined with a compact high power LED to enable a flash LED package that collimates the light on the scene captured by the phone camera. This solution has a relatively high build height and requires a small LED source with limited opportunities for light extraction giving a relatively low efficacy. The system of the invention uses a different optical beam shaping principle combined with LED packages that have a high reflectivity. This approach allows for lower build heights to enable thinner mobile devices, and is not restricted to using small point source LEDs, which allows use of higher efficiency LED package types. Because of the relatively small size of the microstructured ridges, a reduced yellow appearance in the off-state is also made possible as well as freedom of design of the shape of the flash unit.

For example, the base of the housing can have lateral dimensions of around 4 mm, and in particular it is larger than the LED size. The LED chip can have an area of between 0.5 and 2 mm$^2$, whereas the area of the base of the housing can have an area of 10 to 30 mm$^2$. The ridges typically have a base width in the range of 10 µm to 50 µm. Generally, each LED/each optical beam shaping arrangement associated with a respective housing comprises a number of ridges per sheet in about the range of 50 to 1000 per sheet, preferably each LED/optical beam shaping arrangement associated with a respective housing comprises a number of ridges amounts in the range of 100 to 400 per sheet.

This design enables the distance between the LED and the beam shaping optics to be reduced, since the structured optical layers process the light based on light recycling which is independent on the distance from the source, and not using the imaging optics principles as with Fresnel lenses. The reflected light still exits the unit after redirection and some bounces in the package, and the reflections result in the light exiting within the desired angular range over the full area of the open top, even if this is larger than the LED itself. The reflected light is redirected to an angle that is transmitted by the optical beam shaping arrangement.

The structured layers for example comprise foils and they may collimate a part of the incident light, typically the light at large incident angles to the structured layers, and reflect another part of the incident light, typically light near the normal angles, back into the housing to be recycled. The back side of the LED package itself can also be made reflective to improve the efficiency of light recycling. This can, for instance, be achieved using an internal silver backside mirror in the LED chip.

The design enables very low overall build heights to be realized, such as below 1 mm, for example as thin as 0.5 mm. Indeed, there is no fundamental limit to the distance between the LED emitter and the optical beam shaping arrangement. The beam shaping arrangement will still shape (i.e. collimate) the light in a similar way when the distance between the beam shaping arrangement and the LED is varied. Therefore, in principle, the structured layers can be put directly over the LED emitters for minimal build height. The efficiency will however reduce if the structured layers are placed more closely to the LED as the chance for light to be reflected back to the LED is increased, and the LED emitter itself is usually more lossy compared to other packaging materials around the LED package, because these can relatively easily be made highly reflective.

In practice, a trade-off can be made between the build height of a package required by the design and the efficiency corresponding to this build height.

This design also means there is no strict need to start with a small LED emitter with limited lateral size. Therefore the LED chip area may be larger than usual (when combined with a Fresnel lens), or the LED packages may contain a phosphor filling the housing (sometimes known as a goop phosphor) or vicinity phosphor construction with a thinner phosphor layer located at a distance from the LED source. These options result in a lager emitter size than usual. Such package options cannot be combined with a Fresnel lens solution into a compact flash package.

By enabling a larger LED chip or phosphor size, light can be extracted more efficiently from the LED package to enhance efficacy and/or to generate more output light than usual (stronger flash or video flash operation).

Also multiple LED emitters can be used below the beam shaping arrangement. For instance, array emitters, such as an array of mid-power LEDs covered with phosphor can be used as a larger area emitter. This can reduce cost by allowing lower cost LEDs to be used.

Different color LED emitters can be used, such as a blue LED with phosphor, and a red LED package, or else a blue, green and red LED combination in order to make colours at desired colour points. The structured layers can be used to shape/collimate the different colors but also mix the light in the far field.

As another example, multiple LED emitters of the same color can be used inside the same package and covered by the same optical beam shaping structures into a compact multi-LED emitter.

Again, using a larger LED light output area by using multiple emitters allows for more light output to make stronger flash packages. This could be of particular interest for video flash.

The reflection of light by the structured layers helps to dim the yellow appearance of the package. When part of the emitted light is reflected back by the optics into the housing with limited phosphor coverage there is extra reduction of yellow appearance by mixing in of light from the white interior and blurring of the direct image seen from the yellowish LED (multiple parallax shifted dimmed LED images).

The outer periphery of the structured layers can be made into any shape, for instance by stamping the sheets into a specific shape. The beam shaping function does not require that the outer periphery of the optics is of a circular shape, such as in a lens. Fundamentally that is because the beam profile is generated by each micro-optical structured element (i.e. each ridge), independent of the location on the structured layer. The outer shape may therefore be triangular, rectangular, oval, hexagonal etc. The shape can even be used to create a logo of, for instance, the mobile phone company. The package covered by the shaped optics can be made into a similar shape to match the shape of the optics. For instance, the package may be a white reflective molded component that is molded into the specific shape.

If parts of the optics are covered or blocked to create a pattern, image, text or logo, this, may dim the light partly, but will not influence the emitted beam profile in the far field.

One way of blocking the light is to add another reflective component, such as a white reflective foil or a specular reflecting mirror foil, with a stamped out shape, on top of the beam shaping optics. As such, the outer periphery of the optics may not be shaped, but any shape may then be applied by using the partially blocking or reflecting layer covering the optics.

If a large area phosphor is used, or a large area LED, the heat generated in the LEDs and the phosphor is spread out more than in a conventional solution, which enables the device to have a higher capacity in either pulsed or DC operation for increased hot efficiency or allowing a higher luminous flux out of the flash package.

The crossing angle is preferably between 60 and 120 degrees, more preferably between 70 and 110 degrees. One specific example has ridges of one sheet crossed at approximately 100 degrees (±5 degrees) to the ridges of the other sheet (which is of course equivalent to 80 degrees). This has found to be of particular interest for providing optimal uniformity along the desired screen ratio of 4:3. A 90 degree crossing angle can instead be used.

The top apex angle of each sheet is preferably in the range of 70 to 130 degrees, more preferably 90 to 110 degrees. They may be the same, but in one example, the sum of the top angles of the two sheets is in the range 170-220 degrees, more preferably in the range 190 to 210 degrees. Thus, if the angle for one sheet is increased, the angle of the other can be decreased. Also, by using a different angle in the first structured layer with respect to the second structured layer, and a similar refractive index of both structured layers, the beam pattern can be made asymmetric as in one direction the beam is more collimated than in the other direction. Such an asymmetric beam profile can be used to match the aspect ratio of a 4:3 or 16:9 image taken by the camera. Yet, in practive perfectly sharp apex and valley angles are very difficult to realize, i.e. in practice the best sharpness of the apex is a rounding radius of around 1 micron. Preferably, to meet relatively easy manufacturable purposes, the rounding radius is less than 2 microns. A trade off may be found between the rounding radius (since lower cost manufacturing is possible with a higher rounding radius) and the optical performance specification.

The first structured layer may be in contact with a first material of first refractive index (this layer will be between the two microstructured sheets) and the second structured layer may be in contact with a second material of second refractive index (this layer will be over the top of the structure), wherein the material of the first structured layer has a refractive index of between 0.3 and 0.55 greater than the first refractive index and the the material of the second structured layer has a refractive index of between 0.3 and 0.55 greater than the second refractive index.

These refractive index differences provide the desired beam shaping function, for example collimation. In particular, the refractive index difference is relatively low, since it has been found that increased collimation by using larger refractive index differences means that the particular requirements for a camera (of a mobile phone) flash application are more difficult to meet. The first and second materials may comprise air with a refractive index of 1.0, so that the structured layers have refractive index of 1.3 to 1.55. An air layer can also be provided beneath the first structured layer.

The first and second materials may instead comprise a glue, with a refractive index in the range 1.0 to 1.35, more preferably 1.0 to 1.30. For example a glue refractive index of 1.30 results in the structured layers having refractive index of 1.60 to 1.85.

The first and second materials can be other low refractive index materials. This will again change the preferred refractive index values for the structured layers, in particular higher refractive index values will be needed to retain the beam shaping function compared to the use of air gaps.

For wavelength ranges of interest and when using air layers, the sum of the refractive indices of the materials of the two structured layers then becomes in the range 2.6 to 3.1, and this is more generally in the range 2.7 to 3.0. For example, the refractive index of each structured layer may be in the range 1.4-1.45. The refractive indices of the two structured layers may also be different in order to make an asymmetric beam profile that better matches the aspect ratio of an image taken by the camera. More generally, the sum of the refractive indices of the materials of the two structured layers is 0.6 to 1.1 greater than the sum of the first and second refractive indices mentioned above, and more preferably 0.7 to 1.0 greater.

Each microstructured sheet may comprise a base layer and the structured layer. The first and second structured layers may comprise a silicone such as a methylsiloxane or a methylphenylsiloxane. The base layer can act as a carrier support for the structure layer. However it is not essential that the structure layer is supported by a base layer, for instance, when the structure layer is already self-supporting.

The layers of the structure are selected to enable the structure to withstand high temperatures such as encountered during reflow soldering.

The phosphor can be provided directly over the LED, or filling the housing, or as a layer beneath the first structured layer. Thus, different ways of applying the phosphor can be used. When using a phosphor layer, it may be a thin layer mounted with a certain spacing over the LED.

The invention also provides a camera comprising:

an optical sensor comprising orthogonal rows and columns of sensor elements; and a camera flash unit of the invention, wherein the ridges of one sheet are angled between 20 degrees and 70 degrees with respect to the row and column directions. This improves the uniformity of illumination of the captured image.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a compact LED lighting unit, which may for example be used as a camera flash unit, comprising a reflective housing having a reflective base and an open top. A LED is mounted in the reflective housing and a beam shaping arrangement is provided over the open top of the housing. The beam shaping arrangement comprises first and second microstructured sheets, each having a regular array of elongate parallel ridges facing away from the light source, with the ridges of one sheet crossed with the ridges of the other sheet. In one example the effect of the sheets is to collimate the light. Rays at large angles of incidence may be collimated and transmitted, while rays at smaller angles of incidence are retro-reflected and recycled in the housing.

The optical beam shaping arrangement used in the system of the invention performs a beam shaping function. This function can approximate at least a partial collimation function, in the sense that the light exits with a controlled range of exit angles, to illuminate a desired field of view. The optical function will be referred to below as "collimation" for ease of explanation, but it will be understood that this should not be considered limiting.

The use of collimator foils to collimate light is in itself known, and used for example for backlights for televisions, in the form of brightness enhancement foils (BEF). However, these do not lead to acceptable beam profiles for camera flash applications, since in particular the collimation provided has been found be too strong to meet the camera flash requirements. Also, some materials cannot withstand the high temperatures encountered in compact LED applications.

Figure 1:
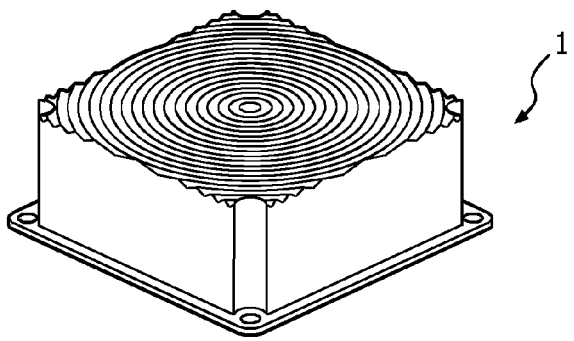
FIG. 1 shows a known LED flash with an integrated Fresnel lens on the upper surface of the package.
Figure 2:
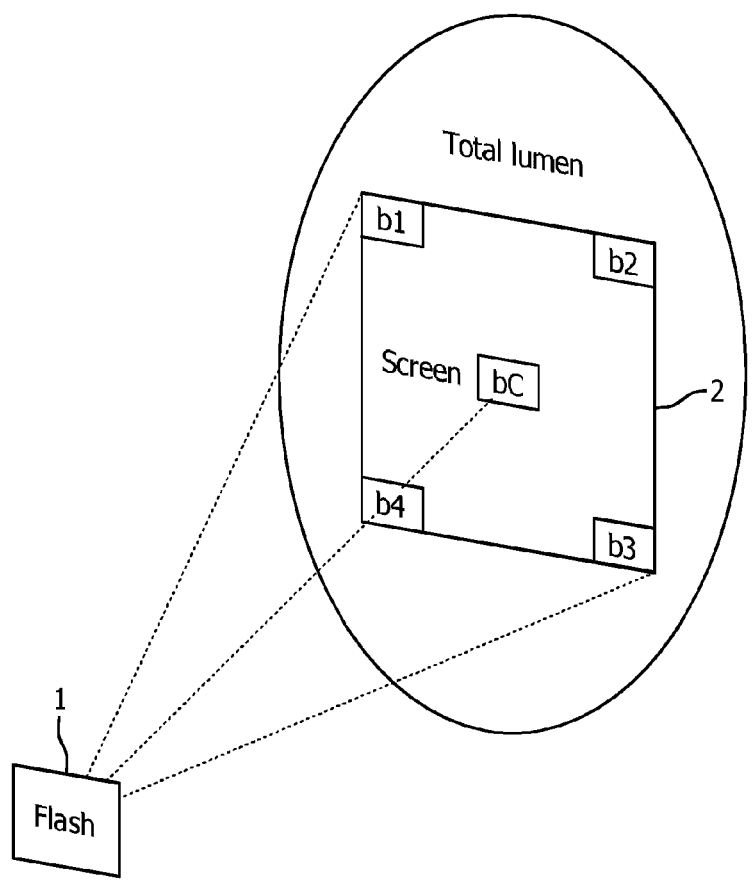
FIG. 2 shows how the flash optical performance is characterized.
Figure 3:
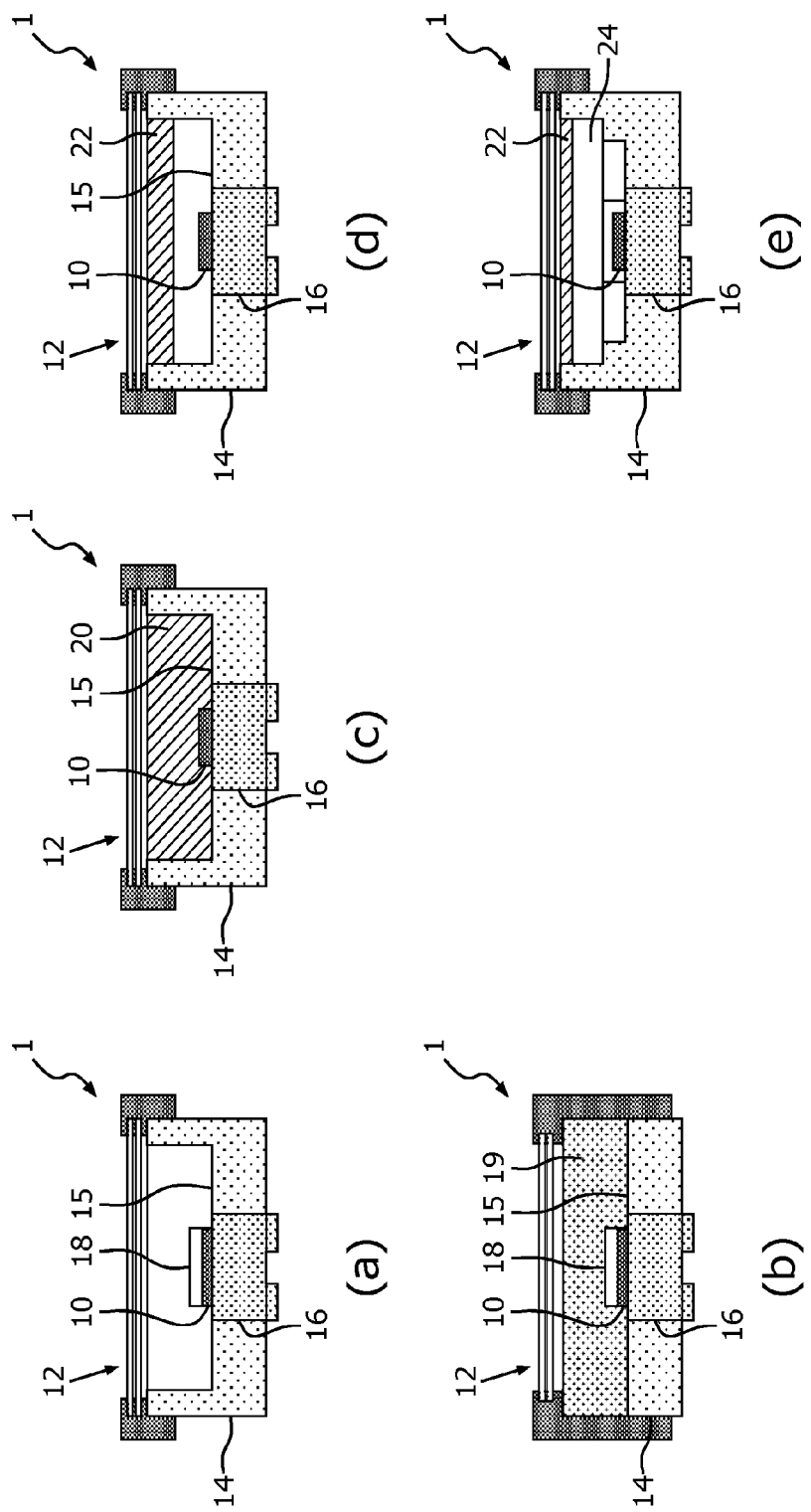
FIG. 3 shows various examples of LED flash making use of a high power die-on-ceramic ("DoC") LED packages.

FIG. 3 shows various example embodiments in accordance with the invention, making use of a high power die-on-ceramic ("DoC") LED package 10 with a 'click-on' cap which incorporates a dual layer optical sheet which function as an optical beam shaping arrangement 12. This dual layer structure functions provides the beam shaping function, such as the collimation function. Each layer includes a structured layer in the form of a regular array of elongate parallel ridges facing away from the light source. The LED 10 is mounted at the base of a housing 14 which forms a reflective mix box construction.

The LED is for example a blue InGaN based diode that is die attached to a ceramic submount 16. The LED can be a flip-chip die with electrical contacts at the back side. There are electrical vias in the ceramic submount 16 which is typically of AlN or $Al_2O_3$, such that the electrical contacts are also present at the backside of the ceramic submount 16 to make the whole assembly solderable at the back side using solder pads.

The typical package size is a height of less than 1.5 mm, for example less than 1.3 mm, and a typical width in the range 3 to 5 mm.

FIG. 3 shows five examples which differ in the way a phosphor layer is implemented. The function of the phosphor layer is to convert a part of the blue radiation from the LED source into a green/yellow spectral range, which in combination with a blue LED emitter creates a white light output.

FIG. 3(a) shows a proximity phosphor 18. This is a conventional phosphor technology that is used in Fresnel lens based flash packages. The phosphor directly covers the blue LED chip. This means that all light emitting areas (chip output and phosphor) have a minimal size. This makes the emitter a small quasi-point source with which an enlarged optical beam shaping structure is aligned to collimate the emitted light for flash operation.

FIG. 3(b) shows the same structure but with an overmold 19 in the housing instead of air, and it shows that the housing is not necessarily a one-piece structure.

FIG. 3(c) shows the use of a phosphor 20 (sometimes known as a goop) which fills the housing. It is dispensed as a viscous liquid and cured to a solid state. The phosphor still covers the LED chip, but extends laterally and is typically applied in a thicker layer. The source area is enhanced because even though the blue LED emitter is small, the emission of the phosphor layer covers a larger area. This can be a more efficient phosphor system than the regular proximity phosphor that covers only the LED die and/or the package onto which the LED die is placed.

FIG. 3(d) shows a vicinity phosphor 22. This is in principle the most efficient phosphor configuration, but uncommon in such packages. The phosphor is not directly placed over the blue LED but located at a short distance, typically in the exit window of the package. In such a configuration, a good cooling path for the phosphor layer is desired which can be influenced by the selection of materials that are between the phosphor layer and the LED base. FIG. 3(e) shows the addition of a glass or translucent alumina (PolyCrystallineAlumina, PCA) layer 24.

In each of FIGS. 3(a) to 3(e), the overall device is a compact LED lighting unit 1. The housing 14 function as reflective housing, which has a reflective base 15 and an open top (reference 51 in FIG. 6).

The two structured layers have ridged microstructures facing upward. The ridges are parallel and thus form prismatic ridge/groove structures. The sheets have a thickness typically in the range 30 to 150 microns (including the base substrate and ridge height). Each ridge has a typical width in the range 10 to 50 microns.

The LED package is preferably highly reflective (for instance >95%) as the microstructured sheets reflect back a significant part of the incident light to be recycled.

A low refractive index layer is provided between the LED package and the beam shaping structure, and also between the individual microstructured sheets. Typically the low index layer is an air interface. This refractive index of the intermediate layer(s) between the components is low in relation to the refractive indices of the LED package and the refractive index of the microstructured sheets. A refractive index of 1 is for an air layer, the LED package may have a refractive index of 2.4 for a GaN LED die, a phosphor silicone can have a refractive index of 1.4-1.53.

When air interfaces are used against the structured surfaces of the microstructured sheets, a refractive index for the structured layer of the microstructured sheets can for example be 1.41.

Figure 4:
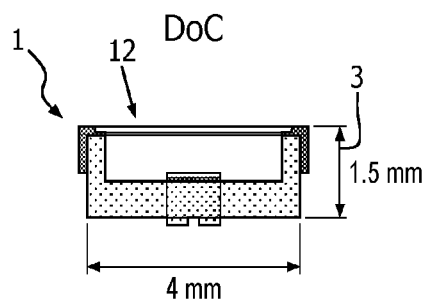
FIG. 4 shows some further examples of LED flash using die-on-ceramic packages and other smaller packages using so-called PSS-based (pre-patterned sapphire substrate) technology packages.
Figure 4:
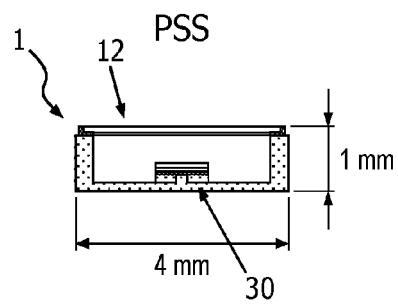
Figure 4:
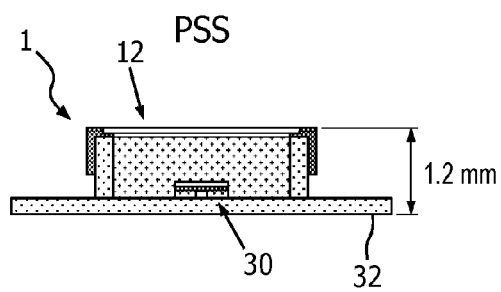
Figure 4:
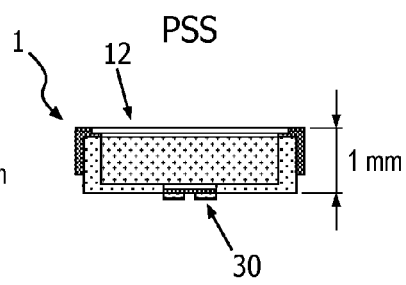
Figure 4:
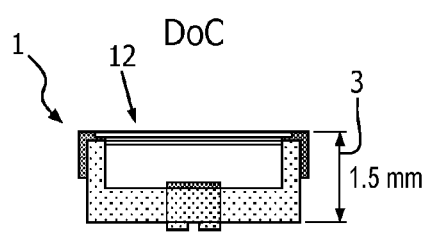
Figure 4:
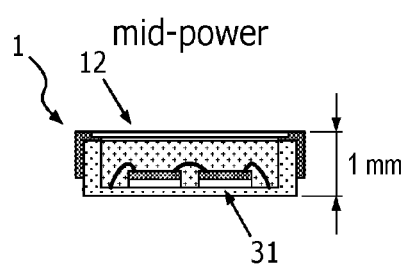

FIG. 4 shows further examples in which two different high power LEDs are compared to mid-power LEDs. Again, each device comprises a compact LED lighting unit 1. Each device has a height 3, and examples of possible height values are shown in FIG. 4. The die-on-ceramic (DoC) packages of FIG. 3 are compared with so-called PSS (pre-structured sapphire) chip scale package LEDs 30 as well with mid-power LEDs 31 with wire-bond connections.

The LED with chip scale package PSS technology does not have a ceramic submount but maintains a sapphire growth substrate on top onto which the InGaN LED layer is deposited. The backside is plated with electric connections to make the component backside solderable. The PSS package 30 can be much thinner, about 0.2-0.3 mm high compared to the DoC package which typically uses a 0.6 mm ceramic submount.

For a thin flash, the PSS structure 30 allows for a thinner flash height.

The mid-power LEDs are typically LEDs where the emitter is also positioned on the growth substrate, such as sapphire, and mounted with the sapphire substrate downwards, usually glued down into the package with a die attach adhesive material. The electrical connections are realized with wire bonds that connect the electrical contacts within the package to the top of the LED die. Multiple LEDs may be used in the package to realize the required amount of light output.

The various mid-power LEDs are connected in strings, which may be in either in series or in parallel connection. These mid-power LED chips are typically also very thin, typically in the order of 0.2-0.3 mm high, allowing a thin overall flash package.

FIG. 4 combines the various LED types with various phosphor types. The phosphor layer may be deposited directly on the LED chip, which is called a proximity phosphor. Such a phosphor layer may cover only the top of the chip, or the top of the package including the ceramic submount, or be wrapped around the emitter, also covering the sides of the transparent sapphire substrate. Furthermore, the phosphor may fill the package into which the LED is placed. This is often called a goop phosphor, in which the phosphor typically consists of inorganic phosphor particles embedded in a silicone resin that is dispensed within the package, such as a white molded leadframe package. Such a configuration is typically more efficient than a phosphor that only covers the emitter die. Furthermore, the phosphor may not cover the LED emitter at all, but be separated with a small distance, typically separated by a layer of transparent material, for instance silicone or glass or ceramic. The phosphor layer is then positioned in the vicinity of the top of the package, covering the package laterally to prevent blue light leakage from the package. Such a vicinity phosphor is typically more efficient that the other above mentioned phosphor types, provided that the LED package is highly reflective.

FIG. 4(a) shows a DoC structure using a proximity phosphor as in FIG. 3(a).

FIG. 4(b) shows a PSS structure 30 using a proximity phosphor and shows that the package height is reduced to 1 mm. The PSS LED is soldered into a cavity housing, such as a white silicone molded leadframe package. The proximity phosphor may be conformally deposited around the PSS chip. The cavity housing typically has backside contacts to allow further assembly of the flash LED to a PCB. The thin housing, thin PSS, and thin beam shaping arrangement result in an overall thin package in a height range of about 0.6 to 1.2 mm. The microstructured sheets of the beam shaping arrangement 12 may be attached to the top of the housing, for instance with an adhesive glue or with an adhesive tape.

FIG. 4(c) shows a PSS LED package 30 using a phosphor which fills the housing again with a 1.2 mm package height over a thin reflective PCB 32 on which the LED chip and housing side walls are mounted. The housing may be a molded white silicone frame that is molded onto the PCB or attached with an adhesive. The interior of the cavity formed by the housing and the PCB is preferably filled up with a goop phosphor or with a transparent encapsulation material, such as a silicone, when the phosphor layer is confined on top of the emitter. The thin PCB may have an interconnect to the backside for electrical connection, but may also extend laterally to be able to solder contact wires to the supply contacts connected to the LED on the top of the PCB outside the housing area.

FIG. 4(d) shows a PSS structure 30 using a phosphor which fills the housing again with a 1 mm package height but with the housing base molded around the LED chip.

FIG. 4(e) shows a DoC structure using a vicinity phosphor as in FIG. 3(d), and FIG. 4(f) shows multiple mid-power LED chips 31 using a goop phosphor as shown in FIG. 3(c), with the chip attached to the electrical contacts at the base of the housing with wire-bond connections. Two mid-power chips are drawn but three or more chips may also be used to generate a sufficient amount of flash light. To accommodate the higher area using multiple mid-power LEDs, the lateral dimensions of the package may be increased.

Apart from the LED types mentioned, also Vertical Thin Film (VTF) LEDs may be used in the examples given, where the LED has one electrical contact at the top of the emitter connected with a wire-bond and one electrical contact towards the backside of the chip for solder attach to the package or a PCB.

Thus, the PSS chip can be mounted in a reflective housing that is either molded around the PSS component, or the chip can be directly soldered to a high reflectivity substrate, such as a thin PCB or a pre-fabricated light mixing package, such as a plastic leaded chip carrier (PLCC) package or similar leadframe component, for instance a QFN package. The latter pre-molded packages are more easily realized than molding packages directly around the PSS chip.

The microstructured sheets can be manufactured by creating a master stamp, for example in polycarbonate sheet via laser patterning. The master stamp can then be replicated in silicone to form a negative of the master. This second master is then imprinted into a liquid silicone precursor layer that is coated to a thin base foil, cured to a solid layer and released from the silicone master stamp. Such a master may also be plated and covered with a metal, such as nickel to obtain a metal replicate master of the original. Alternatively, the master may be manufactured by precise cutting/machining of a metal part to produce a metal master. The metal master plate may be replicated by coating a layer of liquid precursor material, such as a silicone liquid onto a base foil carrier support. The silicone may be thermally cured and released from the master. Alternatively, the coating liquid may be a UV-curable silicone material such as commercially available from silicone suppliers. By UV light exposure the layer is cured to such an extent that it can be released from the master with a fixed micro-structure shape. Subsequently the layer can be further cured thermally in an oven to realize a full cure of the micro-structure layer.

Apart from these batch-wise processes, it is also possible to manufacture the foils on roll-to-roll coating equipment, as is common in the production of optical films, such as brightness enhancement films. In such a set-up, a roll of base foil is pulled through a roller system and coated with a thin liquid layer of the coating precursor for instance using slot-die coating. The roll is then contacted with a rotating drum that contains the master structure, for instance a nickel master. By flashing with UV light the precursor is cured upon imprint contact with the drum to form a solid microstructure layer. Standard UV-cure acrylates may be used. However, to obtain a high thermal stability a silicone, such as a UV curable silicone or a hybrid silicone material may be used, for instance a silicone-epoxy material.

The base foil can be a thin polycarbonate or a polyester such as PET or PEN. A transparent polyimide foil such as Neopulim (Trade Mark) of Mitsubishi Gas Chemical Company (Trade Mark) is however preferred as this allows the cap formed by the beam shaping optics to withstand high temperatures during reflow-soldering of the flash LED package as it withstands short term exposure to high solder temperatures of about 260 degrees.

To obtain a proper adhesion between the base foil and the structured layer into which the micro-structure is replicated or embossed, an adhesion promoting intermediate layer may be applied. Typically this adhesion promoter is coated as a thin film onto the base foil. The adhesion promoter may contain reactive chemical groups that may react to the base foil or a pre-activated base foil, for instance by using an UV-ozone treatment or oxygen plasma or corona treatment of the base foil. Also the adhesion promoter layer may contain reactive groups that may react with a silicone or hybrid silicone coating layer, such as hydride groups or carbon-carbon double bonds.

It is not strictly required that a base foil is used, as the micro-optical layer may also form the full structure layer, provided that sufficient mechanical stability is realized to use the micro-optical layer as a solid, sheet or plate-like layer with sufficient mechanical stiffness for handling and attaching to the LED device.

Figure 5:
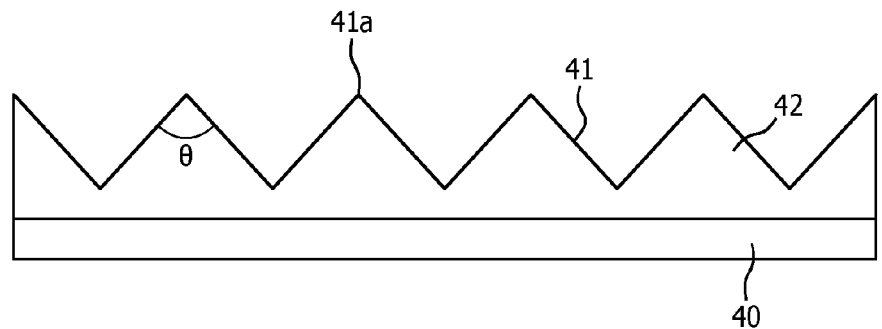
FIG. 5 shows the structure of one microstructured sheet.

FIG. 5 shows the design of one microstructured sheet in the form of a base layer 40 and the structured layer 42. The microstructured layer 42 comprises ridges 41 and each ridge has a peak 41a. FIG. 5 shows the top apex angle θ at the peak 41a of the ridges, which can for example be 90 degrees or 100 degrees, or indeed other angles for example within a range 70 to 130 degrees. In preferred embodiments, the ridge sides are symmetric as shown. A low refractive index silicone (methylsilicone type for example) can be used as the structured layer 42 with refractive index n=1.41. The shape is hence a prismatic groove structure that extends in the depth direction of the cross-section.

The outer shape can take any suitable form, for example enabling a logo or other symbol to be visible at the light emitting surface. The entire housing can instead be designed with a desired aesthetic shape. Of course the periphery can simply be square or rectangular, triangular, an elongated strip, a ring shape or any other shape without changing the beam pattern.

Figure 6:
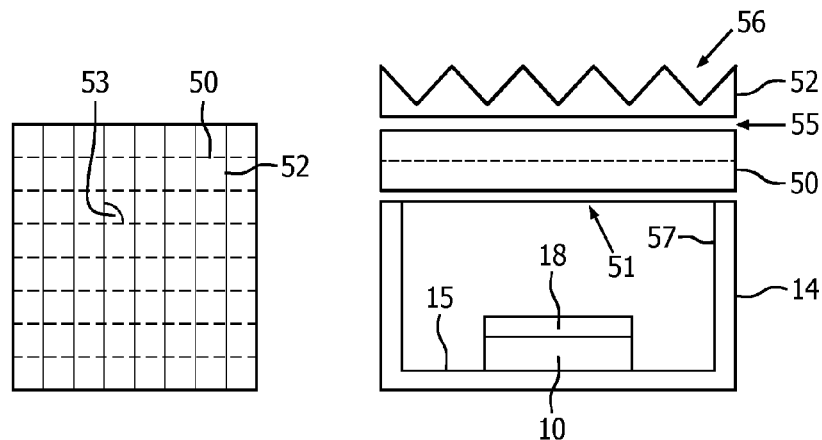
FIG. 6 shows the LED flash structure with the beam shaping collimator design more clearly shown.

FIG. 6 shows the LED flash unit with the design of the beam shaping optics more clearly shown. The beam shaping optics has a first microstructured sheet 50 over the open top 51 of the housing 14, and a second microstructured sheet 52 over the first. They each have a structured layer which provides the regular array of elongate parallel ridges facing away from the light source. FIG. 6 shows that the ridges are crossed with a crossing angle 53. Two orthogonally aligned sheets may be used to achieve collimation in both directions. However the orthogonal orientation shown is not essential. The ridges of the two sheets can for example cross with an angle of 30 to 150 degrees, more preferably 50 to 130 degrees, more preferably 70 to 110 degrees. FIG. 6 also shows the side walls 57 of the housing 14, and these are also reflective.

The sheets are separated by a layer 55 which can be an air gap, although this layer 55 can be a different material (such as a glue) but again of substantially lower refractive index than the structured layers. This requires a higher refractive index of the structured layers than when air gaps are used. The top (second) sheet is also covered by a material layer 56 which may be the same as the layer 55, for example air, or glue which is used to bond a planarizing protective layer on top.

With an air gap, the refractive index of the structured layer 42 is preferably in the range 1.3 to 1.55.

Essentially, the structures need an optical contrast to function. If the sheets are glued together the index of the structured layers will need to be increased and the index of the optical bond needs to be low. A glue of index 1.4 can be found, so that in a first approximation the increase of air refractive index 1 to glue index of 1.4 needs the index of the optical structured layers to increase by 0.4 as well, to the within a range 1.70 to 1.95. This maintains a refractive index difference in the range 0.3 to 0.55.

Typically the glue will have a refractive index in the range 1.3 to 1.6.

Light escapes from the housing at the top towards the microstructured sheets. Depending on the refractive indices and micro optical structure of the microstructured sheets, part of the light is collimated and part is retro-reflected towards the highly reflective housing by means of total internal reflection, where the light is recycled. The recycled light can escape again by the same mechanism. The efficiency depends on the reflectivity of the housing, Fresnel losses at the interfaces between different media and absorption in the media.

In a preferred example, each microstructured sheet has a base layer (40 in FIG. 5) and the structured layer (42 in FIG. 5). The base layer is primarily selected to meet the desired structural properties and thermal stability. For example it can be a polyimide layer (or other material with a refractive index in the range of for instance 1.4-1.7). The structured layer is for example a silicone layer, and the optical structure is imprinted with a stamp before the silicone is cured. A silicone material is preferred because of the excellent photo-thermal stability for LED applications. A preferred silicone type is a methylsiloxane with a refractive index of about 1.41. As an alternative a methylphenylsiloxane type may be used with a refractive index of 1.51-1.53. In general the structured layer may typically have a refractive index of 1.3-1.55 for implementations using air gaps. The refractive index of the base layer is less important since the interfaces of the base layer are parallel to each other and finally do not influence the light ray direction. However a lower refractive index is preferred so that Fresnel reflections at the air interfaces are minimized.

Figure 7:
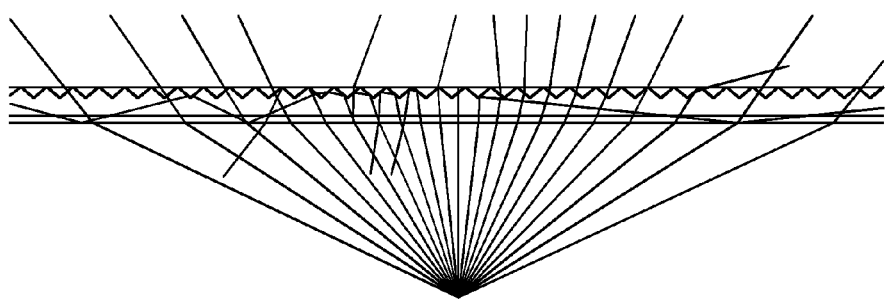
FIG. 7 shows a simulation giving the effect of one microstructured sheet on the light ray directions from a point light source.

FIG. 7 shows a simulation giving the effect of one microstructured sheet on the optical output from a point light source.

Depending on the angle of incidence, the refractive index (difference) and the top apex angle of the ridges (prisms) some rays will be reflected back due to total internal reflection while other rays may escape at the top surface. The smooth surface of the microstructured sheet is directed towards the light source. The angle of incidence is determined by the light source size, its position and distance from the beam shaping optics. Usually for remote phosphor architectures (FIGS. 3(c) to (e)) the emission profile is close to Lambertian, whereas for LEDs with a proximity phosphor, the angular distribution of the rays impinging the microstructured sheet may be slightly more directional, but in all practical cases will not deviate significantly from a Lambertian distribution. The parameters of the system that can be varied are hence the top (apex) angle of the prisms and the refractive index of the material.

The size of the air gap between the housing base (where the LED is located) and the bottom microstructured sheet 50 is kept as small as possible to make the whole module as thin as possible. To guarantee a thin air gap and prevent sticking of the lower microstructured sheet to the housing, small spacer structures may optionally be applied in low density, such as small spherical or rod particles or support poles to prevent two components to touch each other over large areas. Similarly, such spacing structures may be designed on the microstructured sheets to reduce the likelihood of optical contact between the structured layer of the lower layer 50 and the backside of the upper layer 52. For instance, superimposed to the optical ridges a low density of poles may be designed that slightly stick out, such as 10 to 25 microns in height, on top of the height of the optical ridges. This prevents the flat side of the top layer 52 from touching the top of the micro-structures. Such a spacing may also be applied to the backside of the top layer 52, for instance in the form of stripe shaped spacer structures that are aligned roughly perpendicularly to the ridges of the lower microstructured sheet 50.

To protect the micro-optical surface structure on the top of the device from scratches and damage in handling and use, an optional protection sheet may be added on top of the structure, typically a transparent sheet, for instance a transparent polyimide sheet.

In order to fulfill the desired optical specifications the following parameters can be tuned:

top apex angles of both structured layers;

the shape accuracy of the top angle, in terms of rounding radius of the top and rounding radius of the valley of the microstructures;

refractive indices of the structured layers with respect to the material of the surrounding layers (e.g. air);

the relative orientation angle between the microstructured sheets; and the orientation angle of the microstructured sheets with respect to the rectangular screen (for example with ratio 4:3) to which the flash light is directed.

Tuning of these parameters gives a parameter space in which the specifications are satisfied. The top apex angle, shape accuracy and refractive index of both sheets can be varied independently.

The most preferred top angle for both structured layers is in the range of 90 degrees to 110 degrees, as these comply with the strictest specifications of illuminance in the center of the screen (Central Lux) per total lumen (CLPlm) >0.7 and uniformity >0.3.

Figure 8:
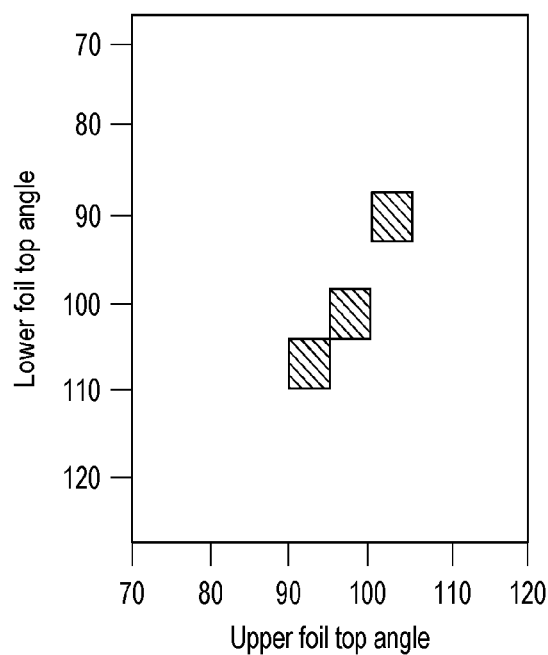
FIG. 8 shows a plot of the lower microstructured sheet top angle versus the upper microstructured sheet top angle to show combinations where lighting conditions are satisfied for a particular orientation with respect to the screen.

FIG. 8 shows a plot of the lower structured layer top (apex) angle versus the upper structured layer top angle. The areas shown are areas for which the combinations of angles satisfy the two conditions above based on simulations carried out at discrete sets of values. FIG. 8 is for orthogonal foils, with the foils at 45 degrees to the row/column directions of the screen. There are two possible 45 degree orientations but both give similar results. The simulation assumes perfectly sharp apex and valley angles whereas in practice the best sharpness of the apex 41*a* is a rounding radius of around 1 micron. It also assumes a refractive index of 1.41 for the structured layers. Preferably the rounding radius is less than 2 microns. A trade off may be found between the rounding radius (since lower cost manufacturing is possible with a higher rounding radius) and the optical performance specification.

These results show that the top angles are preferably in the range of 90 to 110 degrees.

For less strict specifications the parameter space opens up widely.

Figure 9:
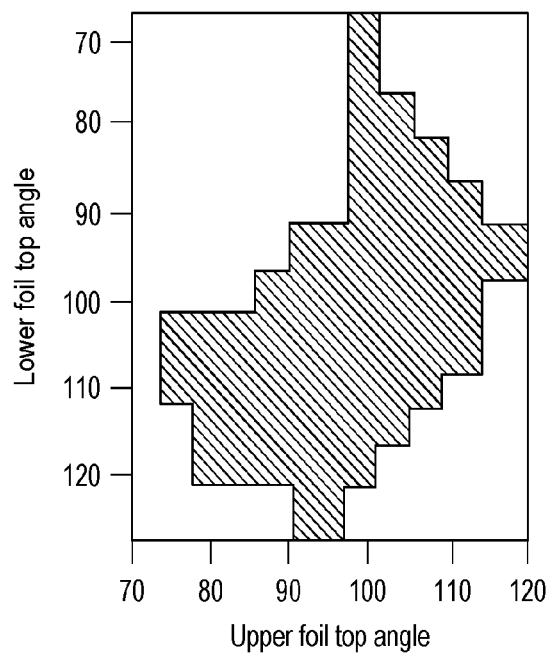
FIG. 9 shows the same plot as FIG. 8 for more relaxed lighting conditions.

FIG. 9 shows the same plot as FIG. 8 but shows the area where the specification is for CLPlm>0.6 and Uniformity >0.2.

Figure 10:
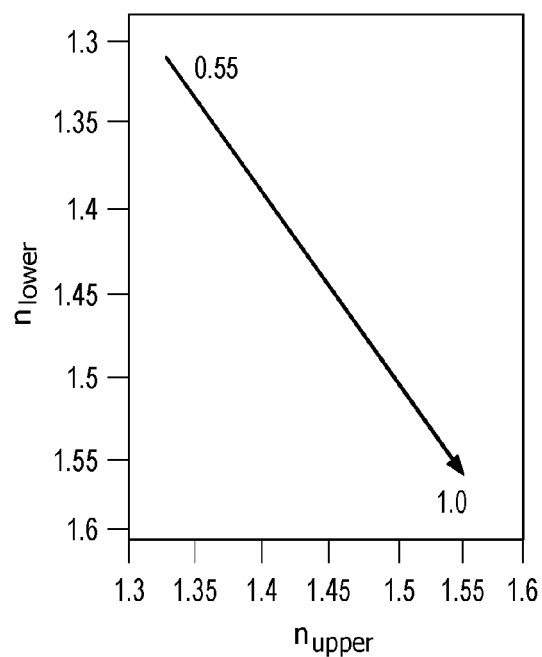
FIG. 10 is used to show the impact of refractive index of the upper and lower microstructured sheets on the ratio of maximal illuminance in the center of the field of view to the total luminous flux.

The impact of refractive index of the upper and lower microstructured sheets on the CLPlm value is shown in FIG. 10 for both top angles of 100 degrees and a 45 degrees orientation of the prism groove direction to one of the axis of the screen/camera sensor. Simulations were carried out with orthogonal foils, by way of example. The y-axis plots the refractive index of the structured layer of the lower sheet and the x-axis plots the refractive index of the structured layer of the upper sheet. The CLPlm parameter was simulated for each combination of refractive index values. The result is generally that an increased CLPlm value is obtained by increasing the refractive index of either or both layers, as represented by the arrow, which shows the range of CLPlm values obtained.

Thus, the central luminous flux per total lumen is highest for higher refractive indices: the light beam is more collimated.

Figure 11:
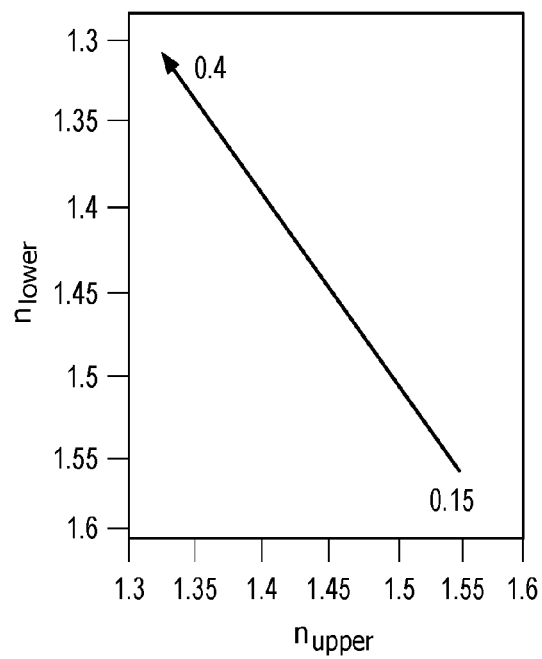
FIG. 11 shows the impact of refractive index of the upper and lower microstructured sheets on the light uniformity.

The impact of refractive index of the upper and lower microstructured sheets on the light uniformity is shown in FIG. 11 again for top angles of 100 degrees and a 45 degrees orientation of the prism groove direction to the screen/camera sensor. Again, simulations were carried out with orthogonal foils, by way of example. The y-axis again plots the refractive index of the lower layer and the x-axis plots the refractive index of the upper layer. The uniformity parameter was simulated for each combination of refractive index values. The result is generally that an increased uniformity is obtained by decreasing the refractive index of either or both layers, as represented by the arrow, which shows the range of uniformity values obtained.

The uniformity depends in a similar way to the refractive index of both layers: good uniformity values can only be realized when the refractive indexes of the layers are limited. For air interfaces an optimum is found when the refractive index of the upper and lower structured layers are: $2.6 < n_{upper} + n_{lower} < 3.1$.

More generally, the sum of the refractive index differences (between structured layers and their adjacent materials) is in the range 0.6 to 1.1.

Figure 12:
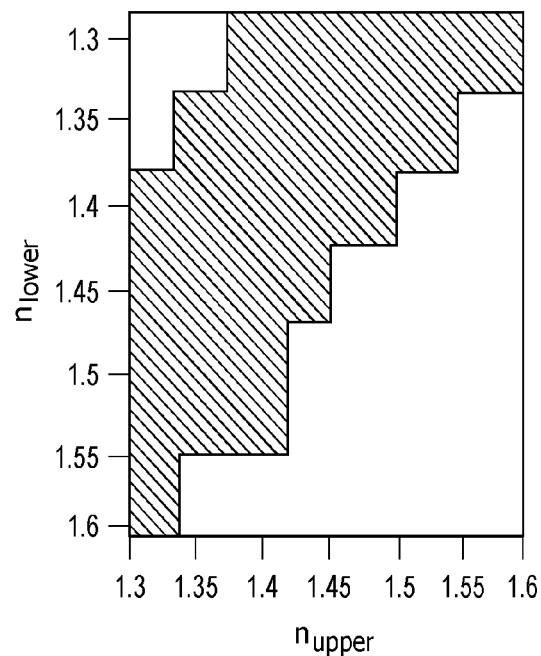
FIG. 12 shows the preferred combinations of refractive indices for a first set of flash criteria.
Figure 13:
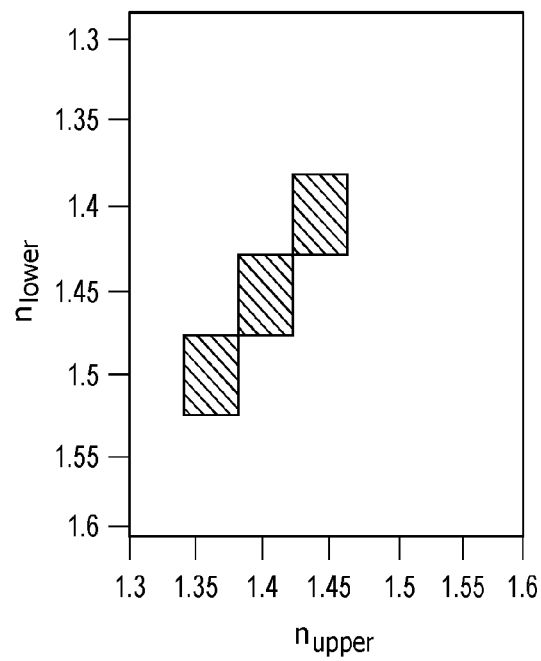
FIG. 13 shows the preferred combinations of refractive indices for a second more stringent set of flash criteria.

The preferred combinations of refractive indices can be derived for a mild flash criterion of >0.2 uniformity and >0.6 CLPLm values shown in FIG. 12, or for a more stringent flash criterion of >0.3 uniformity and >0.7 CLPLm shown in FIG. 13. FIGS. 12 and 13 are for 100 degree top angles of both structured layers and show the regions where the simulations of different refractive index values satisfy the set conditions.

The most optimal refractive index for a 100 degrees top angle of both sheets can be seen to be a combined refractive index of 2.85 within a refractive index range of 1.4 to 1.5.

Simulations also show a strong dependence of the uniformity specification to the orientation of the crossed microstructured sheets with respect to the rectangular screen. For angles of 45 degrees (similar to 135 degrees) with respect to the screen, the uniformity is highest (>0.3) while for 0 degrees (similar to 90 degrees), the uniformity is lowest. Therefore it is possible to align the microstructured sheets correctly with respect to the camera module orientation, which has the same orientation as the screen. In order to enable a higher uniformity (such as above 0.3) the orientation angle range can be set to 45±10°. More generally, the angle can be in the range 20 degrees to 70 degrees.

The central luminous flux per total lumen specification is not dependent on the orientation of the screen.

Figure 14:
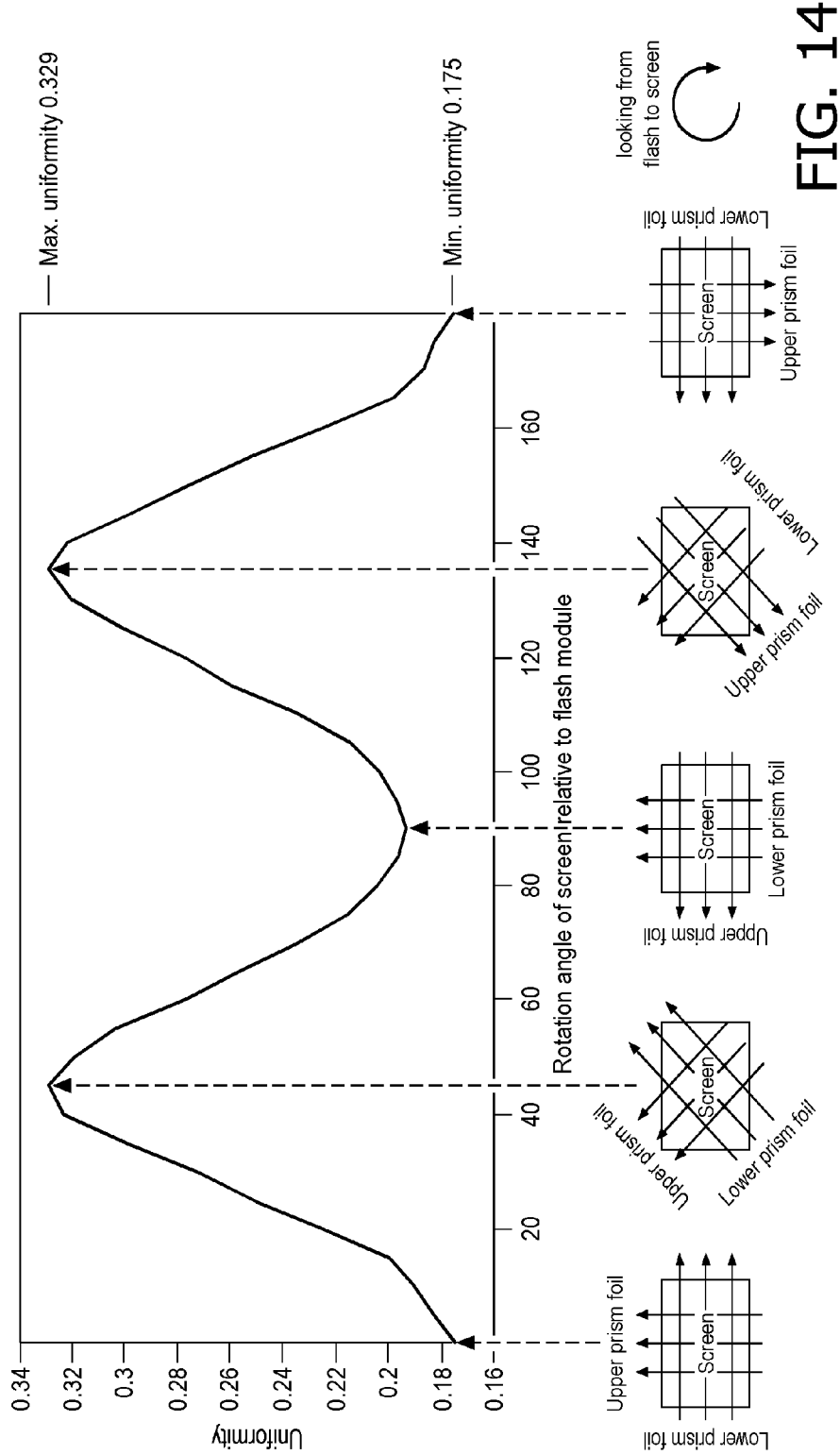
FIG. 14: shows the uniformity as a function of the orientation of the screen relative to the flash module.

FIG. 14 shows the uniformity as a function of the orientation of the screen relative to the flash module i.e. ridge orientation of the upper structured layer relative to the screen. This plot is for an apex angle of 100 degrees for both layers and a refractive index of 1.41 for both structured layers.

It can be seen that the maximum uniformity is obtained at the 45 degree angles (45 and 135 degrees).

Figure 15:
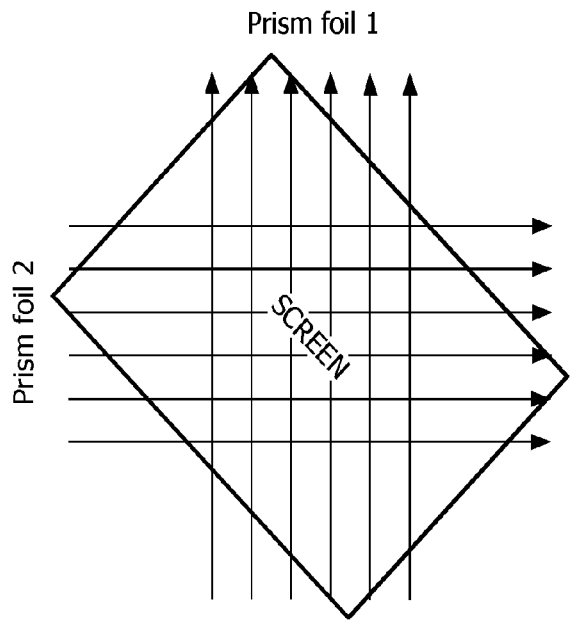
FIG. 15 is used to show more clearly how the screen orientation is defined.
Figure 15:
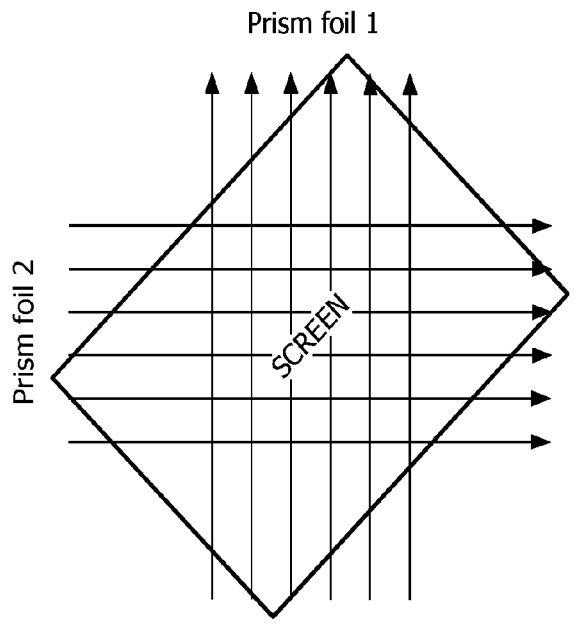

To make FIG. 14 clearer, FIG. 15 shows more clearly what is meant by the foil orientations. Assuming "Prism Foil 1" is closest to the screen, FIG. 15(a) shows the orientation more clearly which corresponds to an angle of 45 degrees in FIG. 14 and FIG. 15(b) shows the orientation more clearly which corresponds to an angle of 135 degrees in FIG. 14. The angle is that which is required to rotate clockwise from a left direction when viewing the screen in portrait mode to reach the orientation of the top foil ridges.

Figure 16:
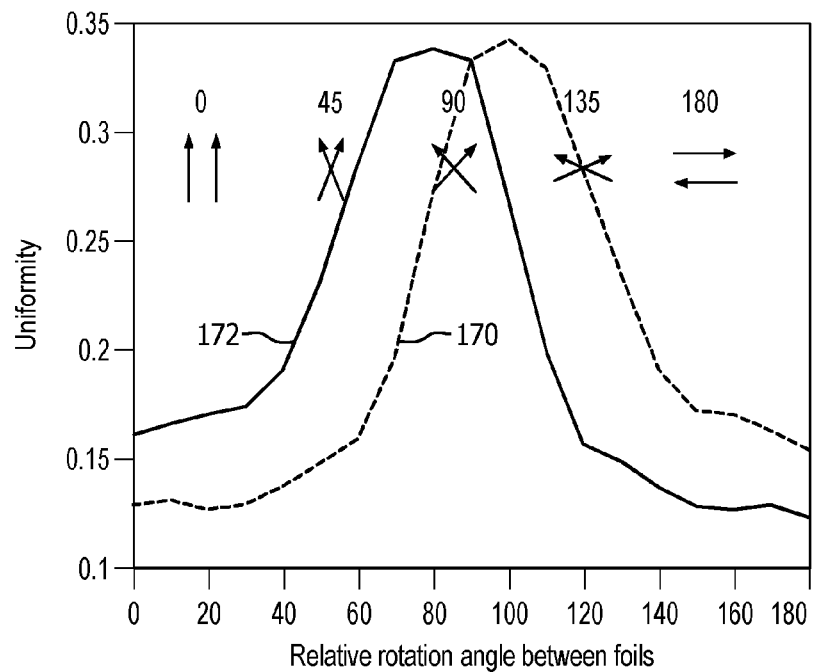
FIG. 16 provides simulation results showing the impact of the relative orientation of two crossed structured layers on the uniformity.

FIG. 16 shows the uniformity as a function of the relative angle between the ridges of the two structured layers. This is a calculation for a 4:3 screen ratio. Plot 170 is for a 135 degree orientation (i.e. FIG. 15(b)) and Plot 172 is for a 45 degree orientation (i.e. FIG. 15(a)). The peak uniformity is at 80 or 100 degrees.

The x-axis shows the foil alignment angle. 0 degrees defines parallel ridges, and 90 degrees defines orthogonal ridges. The uniformity varies by a factor of more than 2 between the best and worst relative angles.

Figure 17:
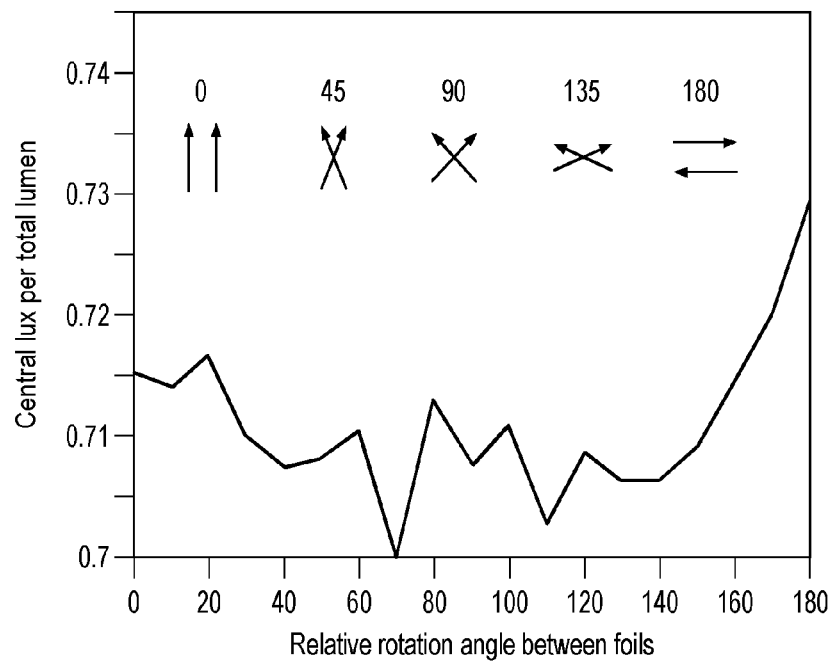
FIG. 17 provides simulation results showing the impact of the relative orientation of two crossed structured layers on the central lux per total lumen.

FIG. 17 shows the central lux per total lumen as a function of the same relative rotation angle between the structured layers. The central lux per total lumen varies by less than 2%.

From these optical simulations, a preferred set of design rules can be formulated to generate beam profiles that illuminate a screen according to the desired specifications related to central luminous flux/total lumen and screen uniformity. It should be noted that some of these design rules can be relaxed if the specifications are also relaxed:

Top angle of lower sheet having prismatic grooves (structure facing upwards) 70-130 degrees, more preferably 90-110 degrees;

Refractive index range of the lower structured layer may be 1.3-1.55 for examples where the lower optical structured layer is immersed into a lower refractive index layer of air, n=1. This means that the beam shaping optics is covered with a top side layer of air and the incident light to the lower sheet is also coming from a backside layer of air. More preferably the refractive index of the lower structured layer is 1.4-1.45. More generally, if a lower index non-air immersion layer is used the refractive index difference between the structured layer and the immersing surroundings is Δn=0.3-0.55. For instance if the immersion layer has a refractive index of 1.3, the refractive index of the optical structured layer should be 1.6 to 1.85, and the combined refractive index is therefore in the range 3.2 to 3.7.

The top (apex) angle of the upper structured layer (structure facing upwards) also 70-130 degrees, more preferably 90-110 degrees;

Refractive index range of upper structured layer 1.3-1.55, and again more preferably 1.4-1.45 for air immersion, but more generally a refractive index difference of Δn=0.3-0.55 (thus the upper and lower structured layers have the same specification ranges).

A relation between the refractive index of the lower structured layer and the upper structured layer of n(lower sheet)+n(upper sheet)=3.1 or less for air immersion, more preferably 3.0 or less.

If the refractive index of either one of the layers is near the top end of the range (1.55), the refractive of the other layer may then be near the bottom end of the range (1.3). If both layers have a refractive index at the top end of the range, the configuration may become too collimating for the specified top angle range.

A link between the top apex angles of the lower and upper microstructured sheets: for lower angles of the lower sheet the upper sheet needs larger angles and vice versa. The combined top angles are for example within 170-220 degrees, preferably between 190-210 degrees (for a refractive index of 1.41 of the structured layers). For example, if the angle of the lower sheet is higher, e.g. 120 degrees, the top angle of the lower sheet is preferably lower, e.g. 90 degrees with a total of 210 degrees;

Rotational angle between upper microstructured sheet ridge direction and screen: most preferably 45+/−10 degrees;

The ridges of one sheet are preferably crossed at approximately 90 or 100 degrees to the ridges of the other sheet, so that the sheets provide optimal uniformity along the desired screen ratio of 4:3. More generally, an angle between the ridge directions of the upper and lower microstructured sheets may be in the range 30 to 150 degrees, more preferably 50 to 130 degrees, even more preferably 70 to 110 degrees, for example 90 or 100 degrees.

The uniformity is sensitive to misalignment as shown in FIG. 16 by up to a factor 2 from orthogonal alignment to parallel alignment of the sheets. For other screen ratios, for instance 16:9, the relative rotation angle between the sheets can be different in order to optimize for uniformity. The central lux does not change much with the relative orientation of the sheets as shown in FIG. 17.

The invention is of particular interest for use in flash LED applications for mobile phones. However the flash LED module can also be used for picture camera flash on photo cameras or video cameras or as part of a flash component integrated in other devices, such as tablets. Other compact lighting applications can also be considered.

In these applications the lateral width of the component, the amount of LEDs used and the total amount of output light may be larger than required for mobile phones. Apart from flash pulses for photos the unit can also operate continuously for video flash.

The examples above show a housing with reflective base and side walls.

Figure 18:
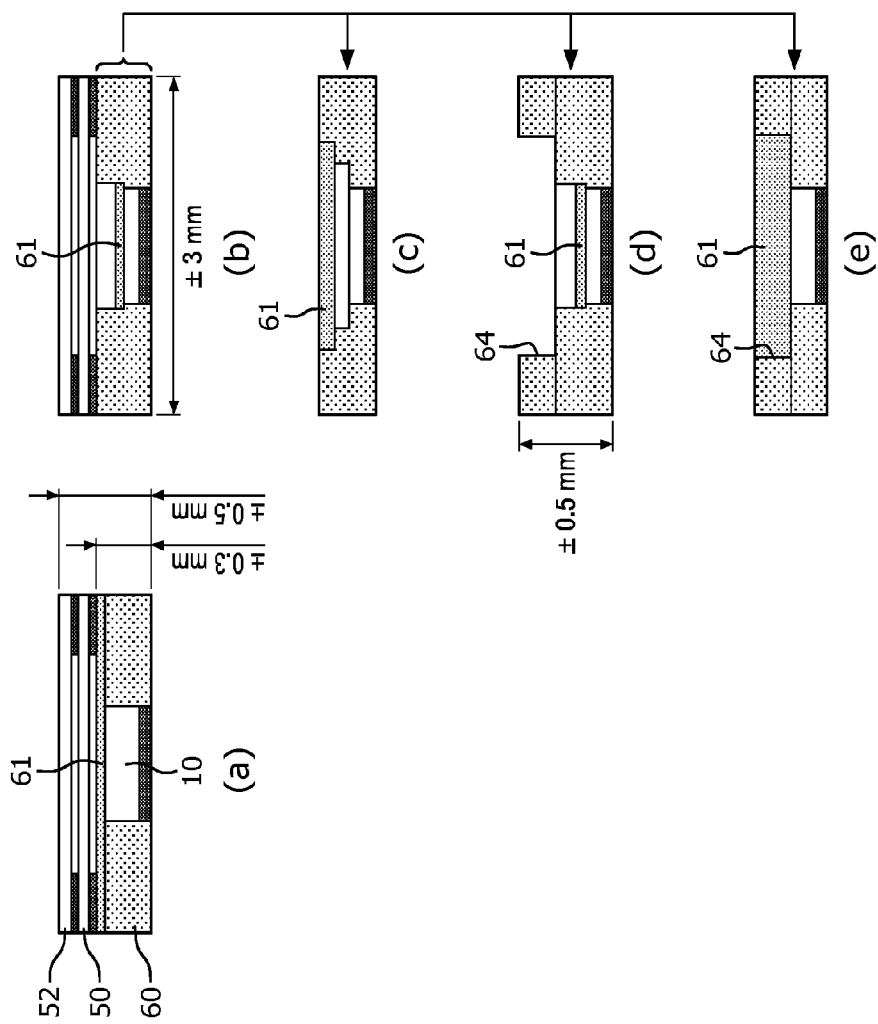
FIG. 18 shows various examples of a LED flash component with very low build height that is realized in various package constructions on a PSS emitter.

FIG. 18 shows various alternative packages.

FIG. 18(*a*) shows a package without side-walls and without PCB. The blue LED chip 10 consists of an epitaxial layer on a carrier substrate such as sapphire with back side contacts, for example a flip-chip architecture. The LED chip 10 is surrounded by a reflective layer 60, such as a white silicone molding. A phosphor coating 61 covers this package and the optical structure layers 50,52 are attached to this package at the periphery, with an adhesive.

Note that in all examples of FIG. 18 the phosphor is shown as 61, even though different phosphor types are shown.

The adhesive is used to attach the two microstructured sheets 50,52 to each other as well as to attach this assembly to the package. This adhesive may be a glue, cured from a liquid state to a solid state, or be a piece of adhesive tape. The adhesive tape may be a tape that is thermally cured or be a tape that is UV-cured after connection of the parts.

FIG. 18(*b*) shows an alternative package in which the phosphor layer 61 is restricted to the emitter area or is only slightly larger than the emitter area.

In FIG. 18(*c*) the phosphor 61 is larger than the chip but smaller than the outside dimensions of the package and there is a distance between the emitter and the phosphor layer, to define a vicinity phosphor. This gap is typically filled with a transparent silicone.

In FIGS. 18(*d*) and 18(*e*) a rim 64 is molded onto the package, thus forming a cavity with a side-wall. In FIG. 18(*d*) this cavity is empty or alternatively filled up with a transparent material, such as a silicone. In FIG. 18(*e*) this cavity is filled with at least a single phosphor layer containing at least a single phosphor material, for instance a powder phosphor material embedded in a silicone material.

FIG. 18(*f*) shows a flat LED package 10 including phosphor 61 that is capped/covered by the optical foil assembly on a frame 66. The frame 66 is placed around the package, either with a gap, or the frame is bonded around the LED package, for instance by filling up the gap between the package 10 and the frame 66 with a transparent silicone or with a reflective silicone.

The packages of FIG. 18 may have back side contacts to be able to solder these packages to a PCB by the customer. Alternatively these packages may already be pre-attached to a thin PCB backside. This backside PCB may extend beyond the LED package area. On the PCB an ESD protection diode, such as transient voltage suppressor, may be attached to prevent the flash LED assembly, also called a flash LED module, to be damaged by electrostatic discharge. Alternatively, this protection diode may be integrated inside the LED package, such as inside the reflective wall or reflective periphery or, least preferred, inside the cavity.

Figure 19:
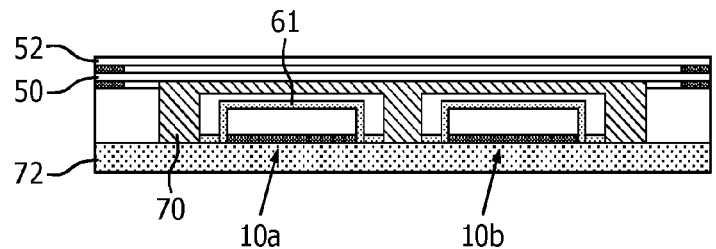
FIG. 19 shows an example of a multi-LED emitter flash component in one package.

As another example, multiple LED emitters can be used inside the same package and covered by the same optical beam shaping structures into a compact multi-LED emitter, as shown in FIG. 19. The emission color of the flash can be controlled by controlling the current ratio between the two LEDs with different white colour temperatures.

FIG. 19 shows two LED packages 10*a*,10*b* with different colour temperatures on a shared substrate 72. Each LED package has its own phosphor layer 61 and there is a transparent fill 70 to form a single overall structure.

The flash unit can then controllably be made to emit multiple colors depending on the desired image perception. For instance, a first LED can emit cool white, of for example 6000K, whereas a second LED can emit warm white, of for example 2700K. As a consequence, the image taken with the camera can be stored in a cool or a warm scene setting depending on the wishes of the photographer. As both LEDs can be put into the same package, this dual channel flash can become very compact and for only the cost of one package, instead of requiring two separate flash LED units, each with a Fresnel lens, which saves space and the high cost of two lenses.

As the beam shaping optics on top of the shared package also has a light mixing capability, a joint operation of both LEDs with controllable current ratios between the channels still allows a very good light mixing of the emitted light distribution, even at small distances to the package. The controlled current ratios allow precise tuning between the extreme color temperatures of the individual LEDs.

Similarly, a third channel may be added to span a color tunable color space, for instance to be able to deviate the color point from the black body radiator, such as a third package with an intermediate colour temperature above the blackbody line. Similarly, a fourth channel may be added, or in general a multi-channel package may be realized in the same package.

It is mentioned above that the package can be shaped to give a desired aesthetic appearance. This appearance can be obtained by light blocking outside the desired shape. One way of blocking the light is to add another reflective component, such as a white reflective foil or a specular reflecting mirror foil, with a stamped out shape on top of the beam shaping optics. As such, the outer periphery of the optics may not be shaped, but any shape may then be applied by using the partially blocking or reflecting layer covering the beam shaping optics.

The light that is blocked is preferably recycled using a highly reflective material that faces the optical sheet. The light that is blocked/reflected will get another chance to escape after interaction with the beam shaping optics and the packages where it may be sent back to the light blocking/reflecting layer shifted in position to be transmitted through the shaped opening(s).

Another way of creating a desired shape is by covering the microstructured sheets, for instance the top layer, with a reflective material. For example, the top layer may be partially covered by dispensing or printing a white reflective material, such as a white silicone layer, on the sheet, which will locally fill-up/cover the micro-optical surface structure. The blocking layer, either as a separate layer or as a layer that is deposited on the microstructured sheets, may be placed on top, in-between the top and the backside of the beam shaping optics. When the blocking layer is used in-between the microstructured sheets, it may also have the function to bond the sheets together into one foil assembly, retaining a gap between the microstructured sheets at the areas where the light is transmitted with the desired beam profile.

In these ways any desired shaped may be superposed over the emitter, to give a desired appearance of the device in the off-state or at dimmed operation of the device, not blinding the viewer.

As mentioned above, it is known to apply a scattering layer to conceal the yellow appearance of the phosphor. This can be applied to the example above, particularly those using a goop phosphor which fills the space of the housing. The examples above make use of arrays of parallel and straight ridges on each microstructured sheet. These ridges may have uniform pitch across the area of the surface. However, this is not essential, and the pitch may locally vary. In this case, the pitch is irregular. One potential benefit of providing an irregular pitch is that it can result ridge height differences. The highest ridge tops of the lower structured layer can then be used to function as spacers to support the top structured layer while permitting a low optical contact area between the two layers.

The ridges do not need to be straight or continuous. For example the area of the microstructured sheets may be divided into areas, with ridges extending in different directions within those areas, for example forming a checkerboard pattern. Within each local region, the ridges of the two sheets cross at the desired angle to provide the desired collimation in two different directions. This is what is meant by the "local" crossing angle. Furthermore, the ridges within each local region are parallel, rather than all ridges on each sheet being parallel. This is what is meant by "locally parallel". Thus, the ridge lines may be considered to be formed as a set of discontinuous ridges each having a length which is less than the lateral dimensions of the microstructured sheet. Alternatively, they may be considered to zig-zag across the area of the microstructured sheet.

Figure 20:
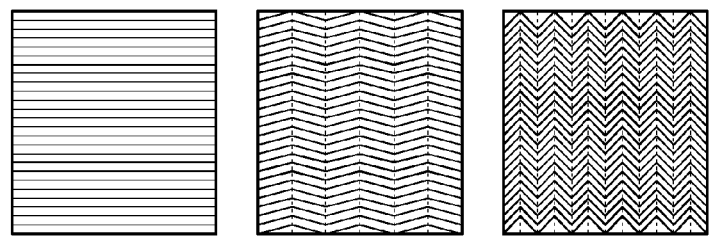
FIG. 20 shows some alternative designs for the ridge structures of the two microstructured sheets.
Figure 20:
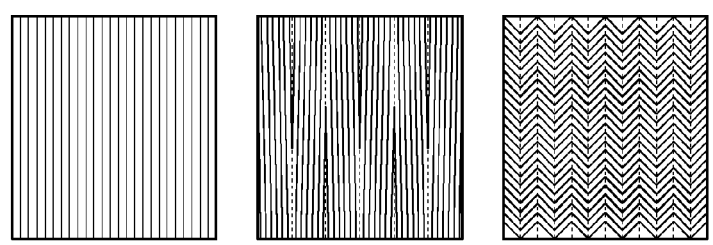

FIG. 20 shows three examples of possible prismatic structures.

FIG. 20(a) shows a regular layout as discussed above, with all structures parallel within each individual foil, and the parallel directions of one foil being orthogonal to the other.

FIG. 20(b) shows a slight "zig-zag" deviation of the prism propagation direction in one foil, and the corresponding pattern in the other foil so that the local crossing points remain orthogonal. In one foil (the top one) the zig zag pattern has a deviation from a straight line of around +15 degrees and −15 degrees for the two sections of the zig zag pattern. The other foil then has straight structures offset by the same angle from the vertical.

FIG. 20(c) shows a further example with a stronger zig-zag pattern, with the relative angle between the two prism elongation directions along one zig zag line of about 90 degrees. Unlike the example of FIG. 20(b) this means the pattern of the second sheet is the same but spatially shifted, and they both are regular triangular waveform lines with a 90 degree peak angle and a 90 degree trough angle.

Again, the local crossing angle of the ridges at each point determines the optical collimation function. With ridges which zig zag, the local crossing angle may not be constant across the full area of the microstructured sheets, but it is designed to meet the specified minimum crossing angle requirement at all regions.

These different arrangements with more complicated ridge structures may be desired for example for aesthetic reasons.

The apex angle is typically constant for the whole of each structured layer. However, this is not essential, and the apex angle may vary across the sheet. This variation will typically only be small, for example within 5 degrees, so that all apex angles are within a given range (such as 90 to 110 degrees).

The compact lighting unit typically has an aperture with a diameter of less than 8 mm, although the arrangement enables the device to be increased in size without a corresponding increase in thickness.

Figure 21:
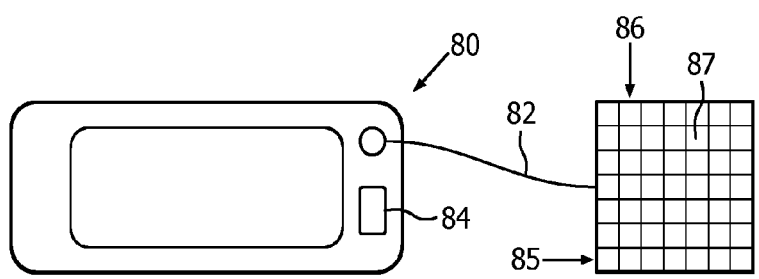
FIG. 21 shows an example of camera using the compact LED unit.

FIG. 21 shows a camera, which is part of a mobile portable device 80. The camera has a camera optical sensor 82 and a flash unit 84 of the invention. The optical sensor comprises orthogonal rows 85 and columns 86 of sensor elements 87 as also shown. As explained above, the orientation of the ridges of one sheet are for example angled between 20 and 70 degrees with respect to the row or column directions.

As discussed above, the housing is reflective. In particular, it is more reflective that the LED chip. A diffuse reflection property is preferred to a specular reflection, so that light leaves the housing with as few internal reflections as possible. A white silicone can form the diffuse reflecting surface.

The examples above all show two microstructured sheets. However further optical layers may be provided, for example for colour control. Furthermore, a third microstructured sheet may be used as part of the collimation function.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a

The invention claimed is:

1. A compact LED lighting unit comprising:
   a reflective housing having a reflective base and an open top;
   an LED mounted within the reflective housing;
   a phosphor associated with the LED; and
   an optical beam shaping arrangement over the open top of the housing,
   wherein the optical beam shaping arrangement comprises first and second microstructured sheets with the second sheet over the first sheet with respect to the reflective base, the first sheet comprising a first structured layer and the second sheet comprising a second structured layer, the structured layers having an array of elongate locally parallel ridges facing away from the LED, and having an apex angle at the peak of each ridge, wherein the ridges of one sheet are crossed with the ridges of the other sheet such that the local crossing angle is between 30 and 150 degrees,
   wherein the ridges of at least one of the first and second microstructure sheets form a zig-zag pattern, and
   wherein each LED/optical beam shaping arrangement associated with a respective housing comprises a number of ridges per sheet in about the range of 50 to 1000.

2. A lighting unit as claimed in claim 1, wherein the apex angle of the first and second structured layers is in the range 70 to 130 degrees.

3. A lighting unit as claimed in claim 2, wherein the sum of the apex angles of the first and second structured layers is in the range 170-220 degrees.

4. A lighting unit as claimed in claim 1, wherein the first structured layer is in contact with a first material of first refractive index and the second structured layer is in contact with a second material of second refractive index, wherein the material of the first structured layer has a refractive index of between 0.3 and 0.55 greater than the first refractive index and the material of the second structured layer has a refractive index of between 0.3 and 0.55 greater than the second refractive index.

5. A lighting unit as claimed in claim 4, wherein the first and second materials comprise:
   air with a refractive index of 1.0; or
   a glue with a refractive index between 1.3 and 1.6.

6. A lighting unit as claimed in claim 5, wherein the first and second materials comprise air, the apex angle of the first and second structured layers are in the range 95 to 105 degrees, the combined refractive index of the first and second structured layers is in the range of 2.8 to 2.9 and the refractive index of each structured layer is in the range 1.4 to 1.5.

7. A lighting unit as claimed in claim 1, wherein the crossing angle is between 60 and 120 degrees.

8. A lighting unit as claimed in claim 1, wherein each microstructured sheet comprises a base layer and the structured layer over the base layer.

9. A lighting unit as claimed in claim 8, wherein the base layer comprises polyimide, a heat stabilized PET or a heat stabilized PEN.

10. A lighting unit as claimed in claim 1, wherein the first and second structured layers comprise a silicone or a hybrid silicone.

11. A lighting unit as claimed in claim 1, wherein the phosphor is provided:
    directly over the LED with an air gap over the phosphor; or
    filling the housing between the LED and the open top; or
    as a layer beneath the first microstructured sheet and spaced from the LED.

12. A lighting unit as claimed in claim 1, comprising a camera flash unit.

13. A mobile portable device comprising a camera optical sensor and a flash unit as claimed in claim 12.

14. A camera comprising:
    an optical sensor comprising orthogonal rows and columns of sensor elements; and
    a camera flash unit as claimed in claim 12, wherein the orientation of the ridges of one sheet are angled between 20 and 70 degrees with respect to the row or column directions.

15. A camera as claimed in claim 14, wherein the orientation of the ridges of one sheet are angled between 30 and 60 degrees with respect to the row or column directions.

* * * * *